United States Patent [19]
Itagaki et al.

[11] Patent Number: 5,304,445
[45] Date of Patent: Apr. 19, 1994

[54] PHTHALOCYANINE COMPOSITION, PROCESS FOR PREPARING THE SAME AND ELECTROPHOTOGRAPHIC PHOTORECEPTOR USING THE SAME

[75] Inventors: Mikio Itagaki; Shigeru Hayashida; Megumi Matsui; Hiroko Ishikawa, all of Ibaraki; Yoshii Morishita, Tochigi; Takayuki Akimoto, Ibaraki, all of Japan

[73] Assignee: Hitachi Chemical Co., Ltd., Tokyo, Japan

[21] Appl. No.: 15,836

[22] Filed: Feb. 10, 1993

[30] Foreign Application Priority Data

Feb. 12, 1992 [JP] Japan .................................. 4-025215
Apr. 17, 1992 [JP] Japan .................................. 4-097815
Oct. 6, 1992 [JP] Japan .................................. 4-266420

[51] Int. Cl.$^5$ ............................................. G03G 5/06
[52] U.S. Cl. ........................................ 430/59; 430/76; 430/78; 430/58
[58] Field of Search .................... 430/59, 76, 78, 58

[56] References Cited

U.S. PATENT DOCUMENTS

5,134,048  7/1992  Terrell et al. ..................... 430/59
5,252,417 10/1993  Torida et al. ..................... 430/59

*Primary Examiner*—Marion E. McCamish
*Assistant Examiner*—S. Rosasco
*Attorney, Agent, or Firm*—Antonelli, Terry, Stout & Kraus

[57] ABSTRACT

Disclosed are a phthalocyanine composition which comprises having main diffraction peaks at 7.5°, 22.5°, 24.3°, 25.3° and 28.6° of Bragg angles ($2\theta \pm 0.2°$) in an X-ray diffraction spectrum with Cu K$\alpha$, a process for preparing the same, an electrophotographic photoreceptor using the same and a coating solution for a charge generation layer containing the same.

4 Claims, 7 Drawing Sheets

PHTHALOCYANINE COMPOSITION, PROCESS FOR PREPARING THE SAME AND ELECTROPHOTOGRAPHIC PHOTORECEPTOR USING THE SAME

BACKGROUND OF THE INVENTION

This invention relates to a novel phthalocyanine composition having high sensitivity, a process for preparing the same, an electrophotographic photoreceptor using the same and a coating solution for a charge generation layer.

As a conventional electrophotographic photoreceptor, there may be mentioned a photoreceptor in which about 50 μm of a selenium (Se) film is formed on a conductive substrate such as aluminum by a vacuum vapor deposition method. However, this Se photoreceptor has a problem that it has sensitivity only up to a wavelength of around 500 nm. Further, there may be mentioned a photoreceptor in which about 50 μm of an Se layer is formed on a conductive substrate, and several μm of a selenium-tellurium (Se-Te) alloy layer is further formed thereon. Whereas this photoreceptor has spectral sensitivity to a longer wavelength as the Te content of the above Se-Te alloy is higher, property of maintaining surface charge becomes worse as the amount of Te added is increased. Thus, there is a serious problem that it cannot be used practically as a photoreceptor.

Also, there may be mentioned the so-called composite two layer type photoreceptor in which a charge generation layer is formed on an aluminum substrate by coating about 1 μm of Chlorocyan Blue or a squaraine derivative, and a charge transport layer is formed thereon by coating 10 to 20 μm of a mixture of polyvinylcarbazole or a pyrazoline derivative and a polycarbonate resin having high insulation resistance. This photoreceptor does not have sensitivity to light of 700 nm or more as a matter of fact.

In recent years, there have been reported many composite two layer type photoreceptors in which the above drawbacks have been cancelled, that is, those having sensitivity to around 800 nm which is the wavelength of a diode laser region. However, in many of these, a phthalocyanine pigment is used as a charge generating material, and on a charge generation layer having a film thickness of about 0.5 to 1 μm, a charge transport layer is formed by coating 0 to 20 μm of a mixture having high insulation resistance of a polyvinylcarbazole, a pyrazoline derivative or a hydrazone derivative and a polycarbonate resin or a polyester resin to form a composite two layer type photoreceptor.

In phthalocyanines, not only absorption spectrum and photoconductivity vary depending on central metals, but also these physical properties vary depending on crystal forms. There have been reported several examples of phthalocyanines in which the same central metal is used, but a specific crystal form is selected for an electrophotographic photoreceptor.

For example, there has been reported that various crystal forms exist in titanylphthalocyanines, and charging characteristics, dark decay and sensitivity vary greatly depending on the difference of their crystal forms.

In Japanese Provisional Patent Publication No. 49544/1984, there has been described that a crystal form of titanylphthalocyanine giving strong diffraction peaks at 9.2°, 13.1°, 20.7°, 26.2° and 27.1° of Bragg angles (2θ±0.2°) is preferred, and an X-ray diffraction spectrum chart is shown.

Electrophotographic characteristics of a photoreceptor using the titanylphthalocyanine having the crystal form as a charge generating material are dark decay (DDR) of 85 % and sensitivity ($E_{\frac{1}{2}}$) of 0.57 lux·sec.

Also, in Japanese Provisional Patent Publication No. 166959/1984, a charge generation layer is obtained by allowing a vapor deposited film of titanylphthalocyanine to stand in tetrahydrofuran-saturated vapor for 1 to 24 hours to change a crystal form. It has been shown that the X-ray diffraction spectrum gives strong diffraction peaks at 7.5°, 12.6°, 13.0°, 25.4°, 26.2° and 28.6° of Bragg angles (2θ).

Electrophotographic characteristics of a photoreceptor using the titanylphthalocyanine having the crystal form as a charge generating material are dark decay (DDR) of 86 % and sensitivity ($E_{\frac{1}{2}}$) of 0.7 lux·sec.

Further, in Japanese Provisional Patent Publication No. 17066/1989, there has been described that a crystal form of titanylphthalocyanine having main peaks at least at 9.5°, 9.7°, 11.7°, 15.0°, 23.5°, 24.1° and 27.3° of Bragg angles (2θ±0.2°) is preferred.

In Japanese Provisional Patent Publications No. 131243/1990 and No. 214867/1990, there has been described that a crystal form of titanylphthalocyanine having a main diffraction peak at 27.3° of Bragg angles is preferred.

Electrophotographic characteristics of a photoreceptor using the titanylphthalocyanine having the crystal form described in Japanese Provisional Patent Publications No. 131243/1990 as a charge generating material are dark decay (DDR) of 77.2 % and sensitivity ($E_{\frac{1}{2}}$) of 0.38 lux·sec.

Thus, the phthalocyanines are different in electrophotographic properties depending on the difference of crystal forms and the crystal form is an important factor for deciding characteristics of an electrophotographic photoreceptor.

In Japanese Provisional Patent Publication No. 255456/1991, there has been reported an example using two kinds or more of phthalocyanines and described an example using a mixture of titanylphthalocyanine and a non-metal phthalocyanine as a charge generating material.

As described above, titanylphthalocyanine exhibits extremely high sensitivity and excellent characteristics by changing a crystal form. However, in a laser printer for which it is used, higher quality and higher precision have been achieved, and an electrophotographic photoreceptor having further high sensitivity characteristic has been demanded.

SUMMARY OF THE INVENTION

An object of the present invention is to provide a phthalocyanine composition having high sensitivity, a process for preparing the same, an electrophotographic photoreceptor using the same and a coating solution for a charge generation layer.

The present invention relates to a phthalocyanine composition which comprises having main diffraction peaks at 7.5°, 22.5°, 24.3°, 25.3° and 28.6° of Bragg angles (2θ±0.2°) in an X-ray diffraction spectrum with Cu Kα and a coating solution for a charge generation layer.

Also, the present invention relates to a process for preparing a phthalocyanine composition having main diffraction peaks at 7.5°, 22.5°, 24.3°, 25.3° and 28.6° of Bragg angles (2θ±0.2°) in an X-ray diffraction spectrum with Cu Kα, which comprises making a phthalocyanine mixture containing a titanylphthalocyanine and a halogenated metal phthalocyanine in which a central metal is trivalent, and being amorphous, and then treating the amorphous mixture with an organic solvent.

Generally speaking, a phthalocyanine mixture is a mere physical mixture of two or more phthalocyanines used as starting materials, and an X-ray diffraction pattern of the phthalocyanine mixture comprises piled up (sum) peak patterns of respective phthalocyanines used as starting materials. On the other hand, the phthalocyanine mixture of the present invention is that phthalocyanines used as starting materials are mixed in a molecular order and an X-ray diffraction pattern thereof is different from that of a pattern in which peak patterns of the respective phthalocyanines used as starting materials are piled up.

In another embodiment of the present invention, a process for preparing a phthalocyanine composition comprises making a phthalocyanine mixture containing titanylphthalocyanine and a halogenated metal phthalocyanine in which a central metal is trivalent, and being amorphous by an acid pasting method, washing the amorphous mixture of precipitates with water until the washed water has a pH of 3 to 6 and a conductivity of 10 to 300 μS/cm, preferably 10 to 200 μS/cm, more preferably 10 to 100 μS/cm, and then treating the amorphous mixture with an organic solvent.

Further, an electrophotographic photoreceptor of the present invention comprises, in an electrophotographic photoreceptor having a photoconductive layer containing an organic photoconductive substance on a conductive substrate, said organic photoconductive substance being a phthalocyanine composition having main diffraction peaks at 7.5°, 22.5°, 24.3°, 25.3° and 28.6° of Bragg angles (2θ±0.2°) in an X-ray diffraction spectrum with Cu Kα.

In an additional embodiment of the present invention, an electrophotographic photoreceptor comprises a conductive substrate and a photoconductive layer containing an organic photoconductive substance formed on the substrate, wherein said organic photoconductive substance is a phthalocyanine composition prepared by making a phthalocyanine mixture containing a titanylphthalocyanine and a halogenated metal phthalocyanine in which a central metal is trivalent, and being amorphous by an acid pasting method, washing the amorphous precipitates until a washed water has a pH of 3 to 6 and a conductivity is 10 to 300 μS/cm, preferably 10 to 200 μS/cm, more preferably 10 to 100 μS/cm, and then treating the precipitates with an organic solvent.

Moreover, the present invention relates to a double-layered type electrophotographic photoreceptor which comprises a charge generation layer containing the phthalocyanine composition described above as a charge generating material, and a charge transport layer containing a benzidine derivative represented by the following formula (I):

wherein $R_1$ and $R_2$ each independently represent hydrogen atom, a halogen atom, an alkyl group, an alkoxy group, an aryl group, a fluoroalkyl group or a fluoroalkoxy group, two $R_3$s each independently represents a hydrogen atom or an alkyl group, $Ar_1$ and $Ar_2$ each independently represents an aryl group, and k, l, m, and n each independently represents an integer of 0 to 5.

DESCRIPTION OF THE PREFERRED EMBODIMENTS

In the following, the present invention is described in detail.

The titanylphthalocyanine to be used in the present invention can be obtained by referring to, for example, the description of Japanese Provisional Patent Publication No. 71144/1991, and can be prepared, for example, as mentioned below.

To 120 ml of α-chloronaphthalene is added 18.4 g (0.144 mole) of phthalonitrile, and then 4 ml (0.0364 mole) of titanium tetrachloride is added dropwise to the mixture under nitrogen atmosphere. After the dropwise addition, the mixture is heated and reacted at 200° to 220° C. for 3 hours under stirring, and then the reaction mixture is filtered while heating at 100° to 130° C. and the residue is washed successively with α-chloronaphthalene and then with methanol. The residue is hydrolyzed (90° C., 1 hour) with 140 ml of a deionized water, and this operation is repeated until the solution becomes neutral. The residue is then washed with methanol. Subsequently, the residue was successively washed with 200 ml of N-methyl-2-pyrrolidone heated to 100° C. and then with methanol. The compound thus obtained is dried by heating at 60° C. under vacuum to obtain titanylphthalocyanine (yield: 46 %).

In the halogenated metal phthalocyanine compounds in which a central metal is trivalent to be used in the present invention, a trivalent metal as a central metal includes In, Ga and Al, a halogen includes Cl and Br, and said compounds may have a substituent(s) such as a halogen on a phthalocyanine ring. Said compounds are known compounds, and among them, for example, a synthetic method of monohalogen metal phthalocyanine and monohalogen metal halogen phthalocyanine is described in Inorganic Chemistry, 19, 3131 (1980) and Japanese Provisional Patent Publication No. 44054/1984.

The monohalogen metal phthalocyanine can be prepared by, for example, the following manner.

To 100 ml of quinoline distilled twice and deoxidized are added 78.2 mmole of phthalonitrile and 15.8 mmole of metal trihalide, and the mixture is refluxed under heating for 0.5 to 3 hours. After gradually cooled, the mixture is cooled to 0° C. and then filtered. The crystal is washed successively with methanol, toluene and then acetone, and dried at 110° C.

Further, the monohalogen metal halogen phthalocyanine can be prepared by, for example, the following manner. After 156 mmole of phthalonitrile and 37.5 mmole of metal trihalide are mixed and melted at 300° C., the mixture is heated for 0.5 to 3 hours to obtain a crude product of monohalogen metal halogen phthalocyanine. The product is washed with α-chloronaphthalene by using a Soxhlet extractor.

In the present invention, as to a composition ratio of the phthalocyanine mixture containing a titanylphthalocyanine and a halogenated metal phthalocyanine in which a central metal is trivalent, the content of the titanylphthalocyanine is preferably in the range of 20 to 95 % by weight, more preferably in the range of 50 to 90 % by weight, particularly preferably in the range of 65 to 90 % by weight, most preferably in the range of 75 to 90 % by weight from the point of electrophotographic characteristics such as charging characteristics, dark decay and sensitivity.

The phthalocyanine mixture can be made amorphous by the acid pasting method.

For example, 1 g of the phthalocyanine mixture is dissolved in 50 ml of conc. sulfuric acid, and the solution is added dropwise to 1 liter of pure water cooled with ice water to be reprecipitated. After filtration, the precipitates are washed sufficiently with pure water and then with a mixed solution of methanol/pure water, and then dried at 110° C. to obtain powder of a phthalocyanine composition. The X-ray diffraction spectrum of the phthalocyanine composition thus obtained becomes a spectrum having no clear sharp peak and showing wide amorphous state. As a method of making it amorphous, in addition to the acid paste method using conc. sulfuric acid, there is also a method by dry milling.

Or else, the following method may be employed. That is, 1 g of the phthalocyanine mixture is dissolved in 50 ml of conc. sulfuric acid, and the mixture is stirred at room temperature. Subsequently, the mixture is added dropwise to 1 liter of a deionized water cooled with ice water over about 1 hour, preferably 40 minutes to 50 minutes to be reprecipitated. After left to stand overnight, the supernatant is removed by decantation, and then the precipitates are collected by centrifugation. Thereafter, the precipitates are washed repeatedly with a deionized water which is a washing water until the washing water after washing has a pH of 3 to 6 and a conductivity of 5 to 300 $\mu$S/cm, preferably 5 to 200 $\mu$S/cm, more preferably 5 to 100 $\mu$S/cm. Then, the precipitates are washed sufficiently with methanol, and dried by heating at 60° C. under vacuum to obtain powder of a phthalocyanine composition.

If the pH is less than 3 or exceeds 6, charging characteristics, dark decay and sensitivity are poor, while if the conductivity is less than 5 $\mu$S/cm or exceeds 300 $\mu$S/cm, charging characteristics, dark decay and sensitivity are poor.

By treating the phthalocyanine mixture which is thus made amorphous with an organic solvent to change crystal form as mentioned below, the phthalocyanine composition having specific diffraction peaks of the present invention can be obtained.

For example, 1 g of powder of the phthalocyanine mixture which is made amorphous is added to 10 ml of an organic solvent such as methyl ethyl ketone and N-methyl-2-pyrrolidone, and the mixture is heated and stirred (the above powder/solvent (in terms of weight ratio) is 1/1 to 1/100). The heating temperature is 50° C. to 200° C., preferably 80° C. to 150° C., and the heating time is 1 hour to 12 hours, preferably 1 hour to 6 hours. After completion of the heating and stirring, the mixture is filtered, and the residue is washed with methanol and dried by heating at 60° C. under vacuum to obtain 700 mg of crystal of the phthalocyanine composition of the present invention. As the organic solvent to be used in the present invention, there may be mentioned, for example, alcohols such as methanol, ethanol, isopropanol and butanol, alicyclic hydrocarbons such as n-hexane, octane and cyclohexane, aromatic hydrocarbons such as benzene, toluene and xylene, ethers such as tetrahydrofuran, dioxane, diethyl ether, ethylene glycol dimethyl ether, 2-methoxyethanol and ethylene glycol diethyl ether, ketones such as acetone, methyl ethyl ketone, cyclohexanone and isophorone, esters such as methyl acetate and ethyl acetate, non-chlorine type organic high polar solvents such as dimethyl sulfoxide, dimethylformamide, phenol, cresol, anisole, nitrobenzene, acetophenone, benzyl alcohol, pyridine, N-methyl-2-pyrrolidone, quinoline, tetralin and picoline and halogen type organic solvents such as dichloromethane, dichloroethane, trichloroethane, tetrachloroethane, carbon tetrachloride, chloroform, chloromethyloxirane, chlorobenzene and dichlorobenzene.

Among these, aromatic hydrocarbons, ketones and non-chlorine type organic solvents are preferred, and particularly, N-methyl-2-pyrrolidone, pyridine, methyl ethyl ketone, diethyl ketone, toluene, and tetralin are preferred.

The electrophotographic photoreceptor according to the present invention has a photoconductive layer provided on a conductive substrate.

In the present invention, the photoconductive layer is a layer containing an organic photoconductive substance, including a film of an organic photoconductive substance, a film containing an organic photoconductive substance and a binder, and a double-layered type film comprising a charge generation layer and a charge transport layer.

As the above organic photoconductive substance, the above phthalocyanine composition is used as an indispensable component, and further known pigments may be used in combination. Further, as the organic photoconductive substance, the above phthalocyanine composition is preferably used in combination of an organic pigment which generates a charge and/or a charge transport substance. The above charge generation layer contains said phthalocyanine composition and/or an organic pigment which generates a charge, and the charge transport layer contains a charge transport substance.

As the above organic pigment which generates a charge, there may be used pigments which have been known to generate a charge, such as metallic or non-metallic type phthalocyanine having various crystalline structures, for example, α type, β type, γ type, δ type, ε type and χ type. The above organic pigments may include azo pigments, anthraquinone pigments, indigoid pigments, quinacridone pigments, perillene pigments, polycyclic quinone pigments and methine pigments and have been disclosed in, for example, Japanese Provisional Patent Publications No. 37543/1972, No. 37544/1972, No. 18543/1972, No. 18544/1972, No. 43942/1973, No. 70538/1973, No. 1231/1974, No. 105536/1974, No. 75213/1975, No. 44028/1978 and No. 17732/1979.

Further, τ, τ', η and η' type non-metallic phthalocyanines as disclosed in Japanese Provisional Patent Publication No. 182640/1983 and European Patent Publication No. 92,255 may be used. In addition to those described above, any organic pigment which generates a charge by irradiation of light may be used.

As the above charge transport substance, there may be mentioned a polymeric compound such as poly-N-vinylcarbazole, halogenated poly-N-vinylcarbazole, polyvinyl pyrene, polyvinyl indoloquinoxaline, polyvinyl benzothiophene, polyvinyl anthracene, polyvinyl acridine and polyvinyl pyrazoline, and a monomeric compound such as fluorenone, fluorene, 2,7-dinitro-9-fluorenone, 4H-indeno(1,2,6)-thiophen-4-one, 3,7-dinitro-dibenzothiophene-5-oxide, 1-bromopyrene, 2-phenylpyrene, carbazole, N-ethylcarbazole, 3-phenylcarbazole, 3-(N-methyl-N-phenylhydrazone)methyl-9-ethylcarbazole, 2-phenylindole, 2-phenylnaphthalene, oxadiazole, 2,5-bis(4-diethylaminophenyl)-1,3,4-oxadiazole, 1-phenyl-3-(4-diethylaminostyryl)-5-(4-diethylaminostyryl)-5-(4-diethylaminophenyl)pyrazoline, 1-phenyl-3-(p-diethylaminophenyl)pyrazoline, p-(dimethylamino)-stilbene, 2-(4-dipropylaminophenyl)-4-(4-dimethylaminophenyl)-5-(2-chlorophenyl)-1,3-oxazole, 2-(4-dimethylaminophenyl)-4-(4dimethylaminophenyl)-5-(2-fluorophenyl)-1,3-oxazole, 2-(4-diethylaminophenyl)-4-(4-dimethylaminophenyl)-5-(2-fluorophenyl)-1,3-oxazole, 2-(4-dipropylaminophenyl)-4-(4-dimethylaminophenyl)-5-(2-fluorophenyl)-1,3-oxazole, imidazole, chrysene, tetraphene, acridene, triphenylamine, benzidine and derivatives thereof. As the charge transport substance, the benzidine derivative represented by the above formula (I) is particularly preferred.

In the formula (I), the alkyl group may include those having 1 to 4 carbon atoms such as a methyl group, an ethyl group, an n-propyl group, an iso-propyl group, an n-butyl group and a tert-butyl group. The alkoxy group may include those having 1 to 3 carbon atoms such as a methoxy group, an ethoxy group, an n-propoxy group and an iso-propoxy group. The aryl group may include a phenyl group, a tolyl group, a biphenyl group, a terphenyl group and a naphthyl group. The fluoroalkyl group may include those having 1 to 3 carbon atoms such as a trifluoromethyl group, a trifluoroethyl group and a heptafluoropropyl group. The fluoroalkoxy group may include those having 1 to 4 carbon atoms such as a trifluoromethoxy group, a 2,3-difluoroethoxy group, a 2,2,2-trifluoroethoxy group, a 1H,1H-pentafluoropropoxy group, a hexafluoro-iso-propoxy group, a 1H,1Hpentafluorobutoxy group, a 2,2,3,4,4,4-hexafluorobutoxy group and a 4,4,4-trifluorobutoxy group. Specific examples of the benzidine derivative represented by the formula (I) may include, for example, Compounds No. 1 to No. 6 shown below.

When a mixture of the above phthalocyanine composition and, if necessary, the organic pigment which generates a charge (these are called the former), and the charge transport substance (this is called the latter) is used (when a single layer type photoconductive layer is formed), a weight ratio of the latter/the former to be formulated is preferably within the range of 10/1 to 2/1. Here, a binder is preferably used in an amount of 0 to 500 % by weight, particularly in the range of 30 to 500 % by weight based on the total amount of these compounds (the former +the latter). When the binder is used, an additive such as a plasticizer, a flowability imparting agent and a pinhole preventing agent may be further added, if necessary.

When the double-layer type photoconductive layer comprising the charge generation layer and the charge transport layer is formed, the charge generation layer contains the above phthalocyanine composition and, if necessary, the organic pigment which generates a charge. A binder may be contained in the charge generation layer in an amount of 0 to 500 % by weight, preferably 30 to 500 % by weight based on the total amount of the phthalocyanine composition and the organic pigment, and the above additives may be added in an amount of 0.1 to 5 % by weight, preferably 0.1 to 2 % by weight based on the total amount of the phthalocyanine composition and the organic pigment. Further, in the charge transport layer, the charge transport substance described above is contained, and a binder may be contained in an amount of 30 to 500 % by weight, preferably 50 to 300 % by weight based on the charge transport substance. When the charge transport substance is a monomeric compound, a binder is preferably contained in an amount of 50 to 500 % by weight, preferably 50 to 300 % by weight based on said compound.

As the binder which can be used for all cases described above, there may be mentioned a silicone resin, a polyamide resin, a polyurethane resin, a polyester resin, a polyvinyl butyral, an epoxy resin, a polyketone resin, a polycarbonate resin, a polyacrylic resin, a polystyrene resin, a styrene-butadiene copolymer, a poly(methyl methacrylate) resin, a polyvinyl chloride, an ethylene-vinyl acetate copolymer, a vinyl chloride-vinyl acetate copolymer, a polyacrylamide resin, a polyvinylcarbazole, a polyvinyl pyrazoline, a polyvinyl pyrene and a melamine resin. Further, a thermosetting resin and a photocuring resin which are crosslinked by heat and/or light may be also used.

A thermosetting resin comprising a polyvinyl butyral and a melamin resin in combination is preferred since it has high strength, high abrasion resistance and low hygroscopicity.

In either case, the binder is not particularly limited so long as it is a resin which has insulation property and can form a film under normal conditions, and/or a resin which is cured by heat and/or light to form a film.

The plasticizer which is the additive described above may include paraffin halide, dimethylnaphthalene and dibutylphthalate, the flowability imparting agent may include Modaflow (trade name, produced by Monsant Chemical Co.) and Akulonal 4F (trade name, produced by BASF Co.), and the pinhole preventing agent may inlcude benzoin and dimethylphthalate. These may be suitably selected and used, and the amounts thereof may be suitably determined.

In the present invention, the conductive substrate is a conductive member such as a paper or a plastic film subjected to conductive treatment, a plastic film on which a metal foil such as aluminum is laminated and a metal plate.

The electrophotographic photoreceptor of the present invention comprises a photoconductive layer formed on a conductive substrate. The thickness of the photoconductive layer is preferably 5 to 50 $\mu$m. When a double-layered type photoconductive layer comprising a charge generation layer and a charge transport layer is used, the charge generation layer preferably has a thickness of 0.001 to 10 $\mu$m, particularly preferably 0.2 to 5 $\mu$m. If it is less than 0.001 $\mu$m, it is difficult to form the charge generation layer uniformly, while if it exceeds 10 $\mu$m, electrophotographic characteristics tend to be lowered. The thickness of the charge transport layer is preferably 5 to 50 $\mu$m, particularly preferably 8 to 25 $\mu$m. If the thickness is less than 5 $\mu$m, initial potential is lowered, while if it exceeds 50 $\mu$m, sensitivity tends to be lowered.

In order to form the photoconductive layer on the conductive substrate, there may be employed a method in which an organic photoconductive substance is vapor deposited on a conductive substrate, and a method in which an organic photoconductive substance and, if necessary, other components are uniformly dissolved or dispersed in an aromatic solvent such as toluene and xylene, a ketone type solvent such as methyl ethyl ketone, methyl n-propyl ketone and methyl isobutyl ketone, an ether type solvent such as tetrahydrofuran and dioxane, a halogenic type solvent such as methylene chloride, 1,2-dichloroethane and carbon tetrachloride or an alcoholic solvent such as methanol, ethanol and propanol, and the resulting mixture is coated on a conductive substrate and dried. From environmental hygienics view point, a non-halogenic solvent such as an aromatic type solvent, a ketone type solvent, an ether type solvent and an alcoholic type solvent is preferably used. As a coating method, a spin coating method and a dip coating method may be employed. The charge generation layer and the charge transport layer may be formed in the same manner. In that case, either of the charge generation layer or the charge transport layer may be an upper layer, or the charge generation layer may be sandwiched between two layers of the charge transport layers.

When the phthalocyanine composition of the present invention is coated by the spin coating method, it is preferred that spin coating is carried out at a rotation number of 500 to 4,000 rpm, preferably 500 to 2,000 rpm by using a coating solution obtained by dispersing the phthalocyanine composition in a halide solvent such as dichloroethane and dichloromethane, or a non-halide solvent such as toluene or tetrahydrofuran. Further, when the composition is coated by the dip coating method, it is preferred that the conductive substrate is immersed in a coating solution obtained by dispersing the phthalocyanine composition in a solvent such as methanol, dimethylformamide, chloroform, methylene chloride and 1,2-dichloroethane by using a ball mill or ultrasonic wave.

The electrophotographic photoreceptor according to the present invention may further have a thin adhesive layer or a barrier layer immediately on the conductive substrate, or may have a protective layer on the surface.

EXAMPLES

In the following, the present invention is described in detail by referring to Examples and Preparation examples.

Example 1

In 50 ml of sulfuric acid was dissolved 1 g of a phthalocyanine mixture comprising 0.75 g of titanylphthalocyanine and 0.25 g of chloroindium phthalocyanine, and the mixture was added dropwise to 1 liter of pure water cooled with ice water to be reprecipitated. After filtration, the precipitates were washed sufficiently with pure water and then with a mixed solution of methanol/pure water, and then dried at 110° C. to obtain powder.

Figure 1:
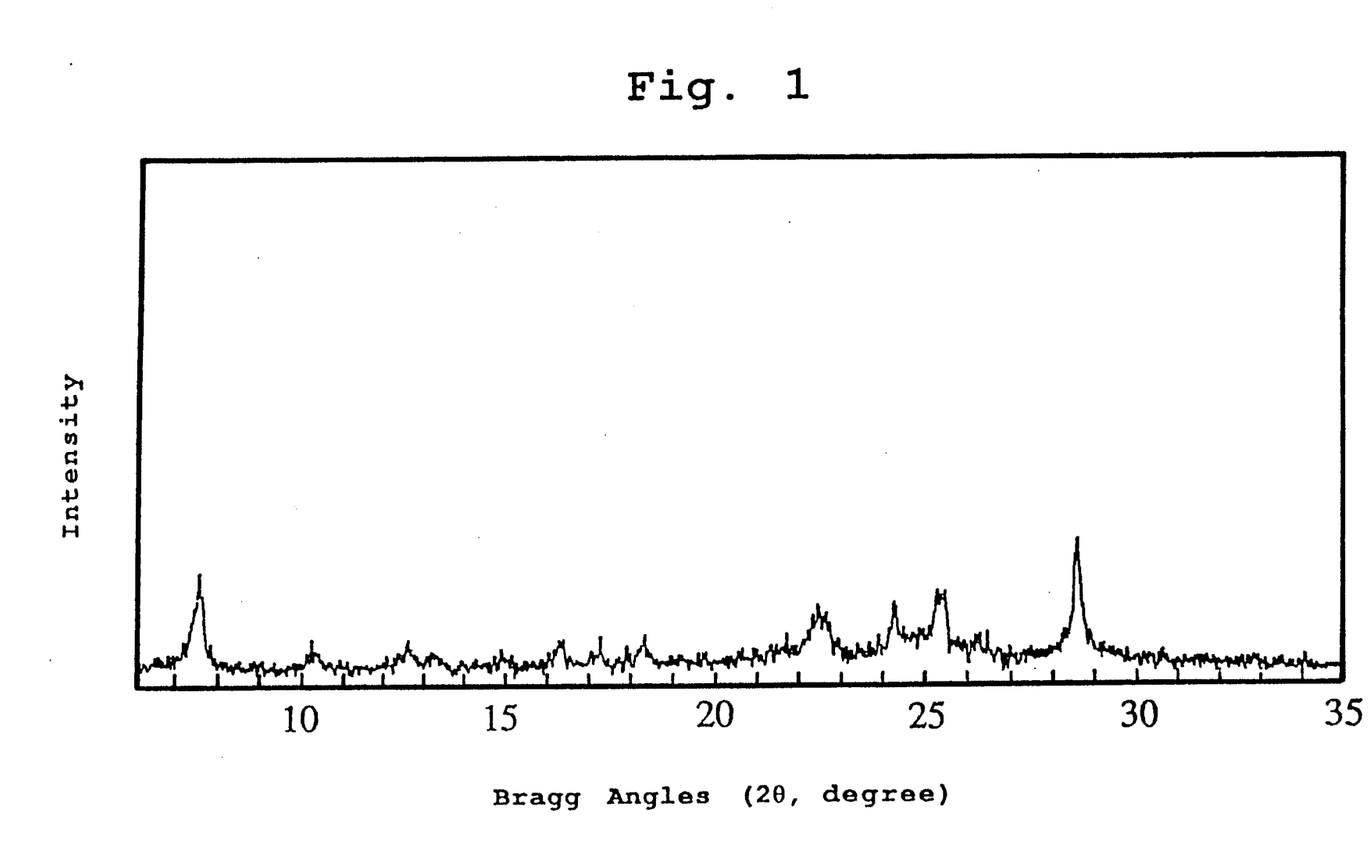
FIG. 1 is an X-ray diffraction spectrum of a phthalocyanine composition treated with N-methyl-2-pyrrolidone in Example 1.

To 10 ml of N-methyl-2-pyrrolidone was added 1 g of this powder, and the mixture was heated and stirred (150° C., 1 hour). After filtration, the residue was washed with methanol and dried at 60° C. under vacuum to obtain 0.78 g of crystal of the phthalocyanine composition of the present invention. The X-ray diffraction spectrum of this crystal is shown in FIG. 1.

1.5 g of the above phthalocyanine composition, 1 g of a silicone resin KR-255 (trade name, produced by Shinetsu Kagaku Kogyo Co.) and 98 g of 1,2-dichloroethane were mixed, and the mixture was dispersed by a planetary ball mill. The dispersion obtained was coated on an aluminum plate (conductive substrate, 100 mm×100 mm×0.1 mm) by the dip coating method, and dried at 140° C. for 1 hour to form a charge generation layer having a thickness of 0.5 μm.

A coating solution obtained by mixing 1.5 g of the above charge transport substance No. 1, 1.5 g of a polycarbonate resin Upilon S-3000 (trade name, produced by Mitsubishi Gas Kagaku Co.) and 15.5 g of methylene chloride was coated on the above substrate by the dip coating method, and dried at 120° C. for 1 hour to form a charge transport layer having a thickness of 20 μm.

The electrophotographic characteristics of this electrophotographic photoreceptor were measured by an electrostatic copying paper testing device Model SP-428 (trade name, manufactured by Kawaguchi Denki Co.). The photoreceptor was charged by corona discharging of −5 kV under dark condition, and initial charge $V_O$ (−V) after 10 seconds, dark decay DDR (%) after 30 seconds and white light sensitivity $E_{\frac{1}{2}}$ (lux·sec) when exposed to white light with a luminosity of 2 lux were determined.

A spectral sensitivity was measured by Cynthia 30HC (trade name, manufactured by GENTEC). An irradiation energy required for reducing a surface potential by half 0.2 second after exposure with an initial surface potential of −700 V, an exposure wavelength of 780 nm and an exposure time of 50 mS, i.e. a spectral sensitivity $E_{50}$ (μJ/cm$^2$) was measured.

A resolution of photoreceptor was measured as follows. That is, an electrophotographic photoreceptor after measuring electrophotographic characteristics was so charged as to have a surface potential of −600 to −700 V by corona charging, then subjected to imagewise exposure with 100 lux·sec using Electrophotographic Association of Japan, Chart No. 1-T as an original image, developed with a toner charged to positive, transferred the prepared toner image to a white paper, fixed to effect an examination, and fixed to obtain a test image and evaluated with fine lines number which could be distinguished per 1 mm. The same toner and the same transfer and fixing methods are used in the respective tests. A resolution of photoreceptor immediately after preparation (initial) of a photographic photoreceptor and a resolution of photoreceptor in which corona charging (a surface potential: −1000 V ±100 V) and discharging by illumination (light of a wavelength of 500 nm was irradiated with an exposure dose of 10 μJ/cm$^2$) had been repeated 10$^4$ times were evaluated.

Examples 2 to 4

Crystals were prepared according to Example 1 except for changing the composition ratio of titanylphthalocyanine and chloroindium phthalocyanine of Example 1 as shown in Table 1.

Comparative Example 1

Figure 2:
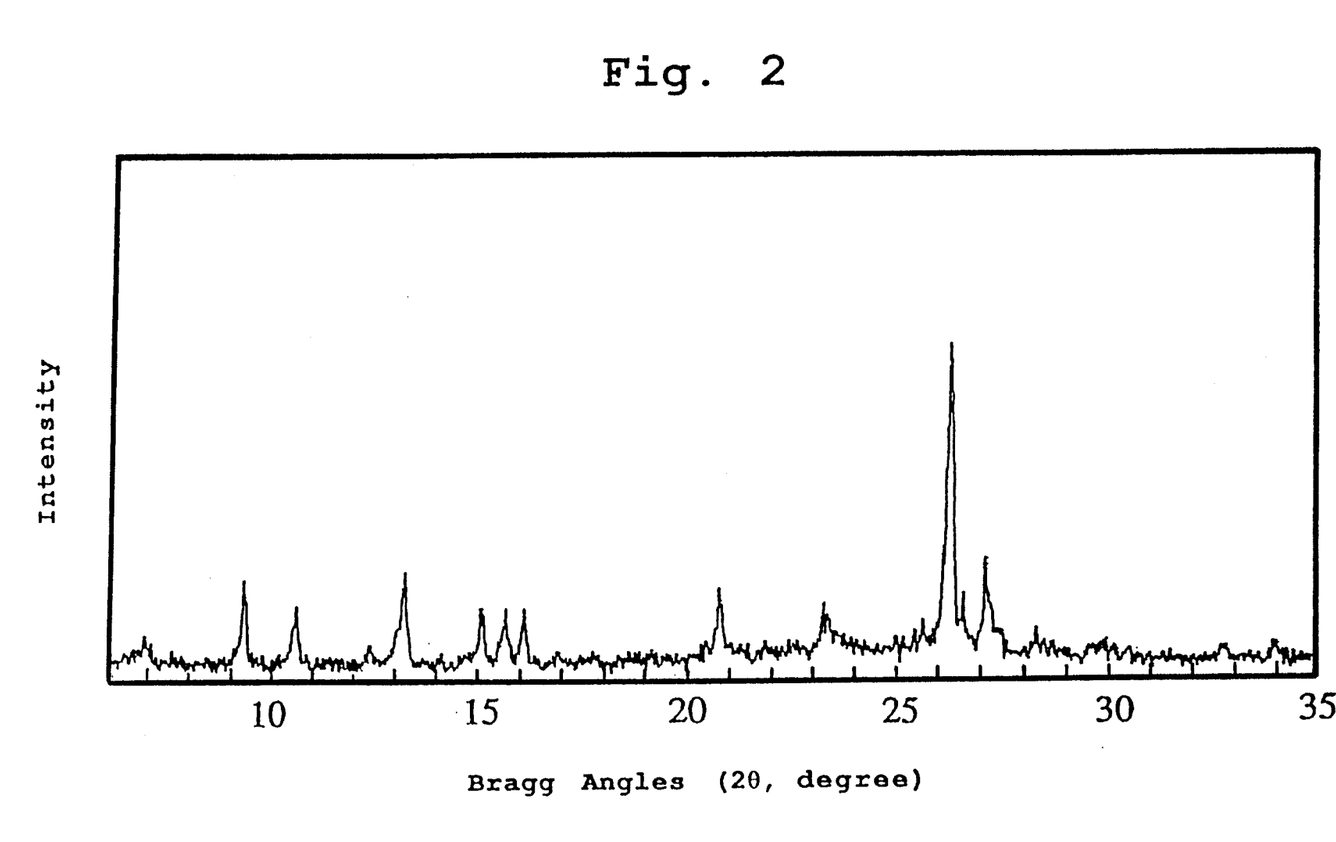
FIG. 2 is an X-ray diffraction spectrum of titanylphthalocyanine treated with N-methyl-2-pyrrolidone in Comparative example 1.

Crystal was prepared according to Example 1 except for using only titanylphthalocyanine in place of the phthalocyanine mixture of Example 1. The X-ray diffraction spectrum of this crystal is shown in FIG. 2.

Comparative Example 2

Figure 3:
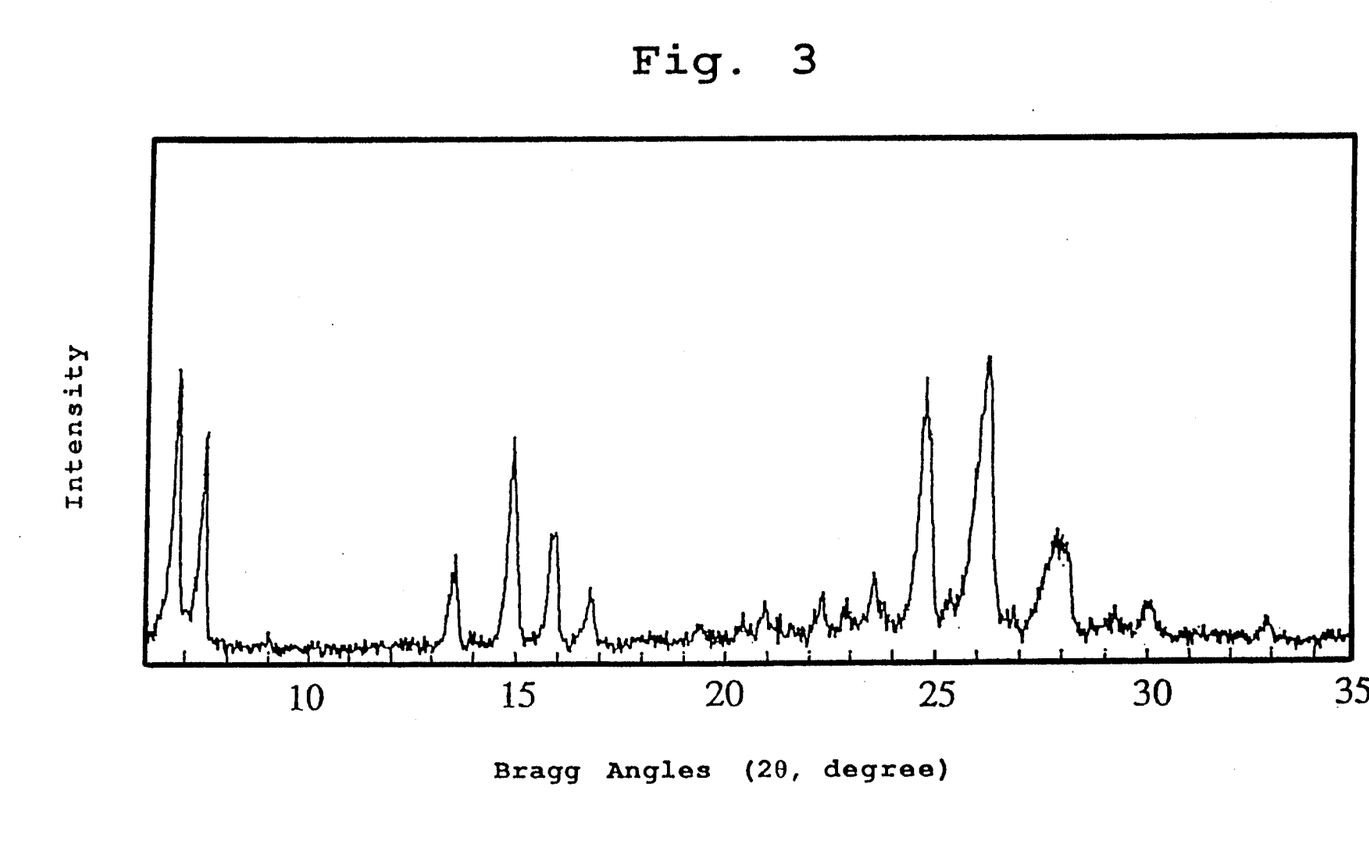
FIG. 3 is an X-ray diffraction spectrum of chloroindium phthalocyanine treated with N-methyl-2-pyrrolidone in Comparative example 2.

Crystal was prepared according to Example 1 except for using only chloroindium phthalocyanine in place of the phthalocyanine composition of Example 1. The X-ray diffraction spectrum of this crystal is shown in FIG. 3.

Comparative Example 3

Figure 4:
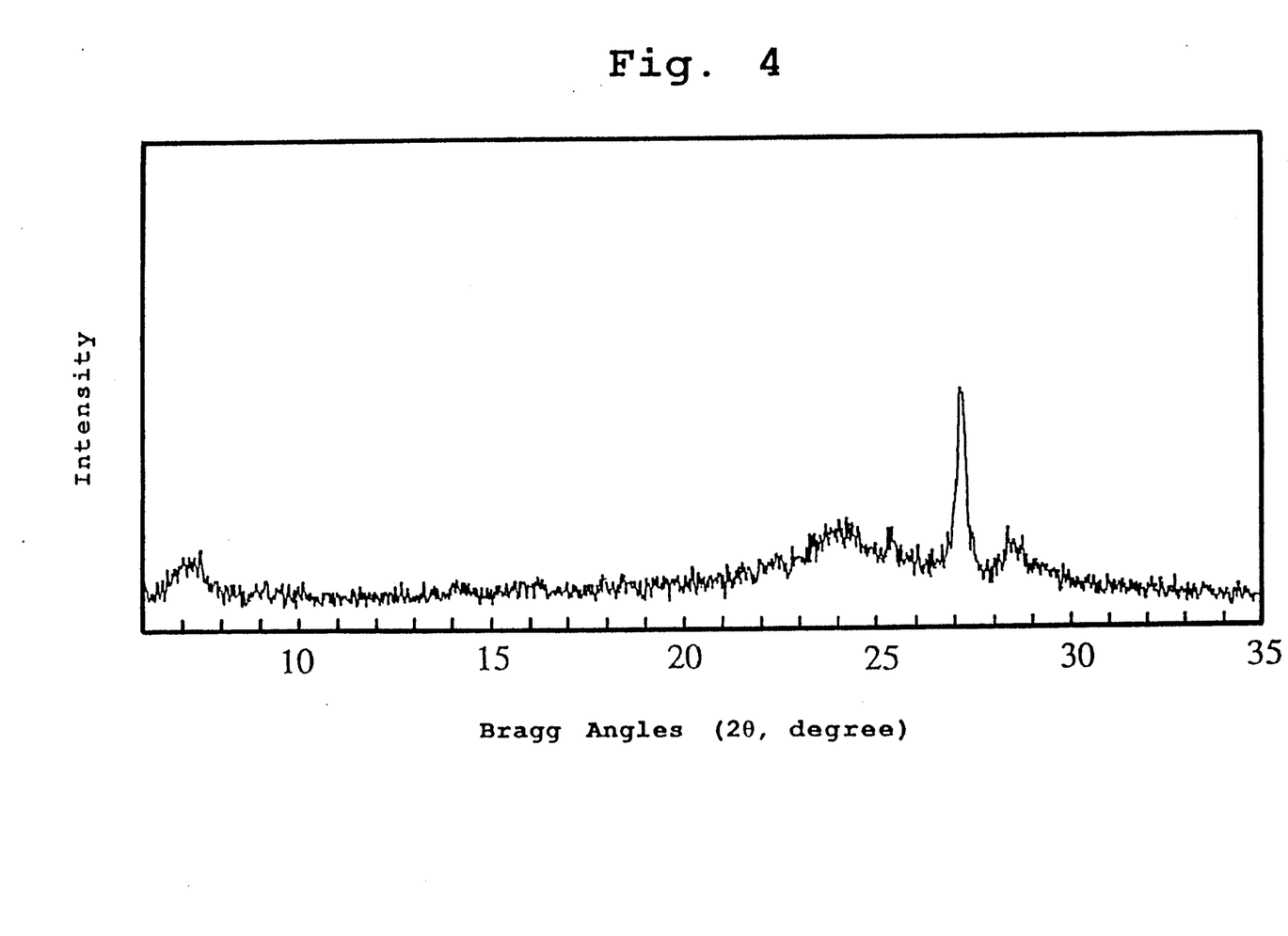
FIG. 4 is an X-ray diffraction spectrum of a mixture of titanylphthalocyanine and chloroindium phthalocyanine which is made amorphous with sulfuric acid in Comparative example 3.

In 50 ml of sulfuric acid was dissolved 1 g of a phthalocyanine mixture comprising 0.75 g of titanylphthalocyanine and 0.25 g of chloroindium phthalocyanine, and the mixture was added dropwise to 1 liter of pure water cooled with ice water to be reprecipitated. After filtration, the precipitates were washed with pure water and then with a mixed water of methanol/pure water, and then dried at 110° C. to obtain powder. The X-ray diffraction spectrum of this powder is shown in FIG. 4. Electrophotographic characteristics are evaluated in accordance with Example 1.

The electrophotographic characteristics of Examples 1 to 4 and Comparative examples 1 to 3 are shown in Table 1.

TABLE 1

| | TiOPc (wt %) | InPcCl (wt %) | Initial charge $V_0$(−V) | Dark decay DDR (%) | White light sensitivity $E_{\frac{1}{2}}$ (lux·sec) | Spectral sensitivity $E_{50}$ (μJ/cm$^2$) | Resolution (line/mm) | |
|---|---|---|---|---|---|---|---|---|
| | | | | | | | Initial | Charging·discharging after 10$^4$ times |
| Example 1 | 75 | 25 | 1020 | 66.9 | 0.8 | 0.30 | 12.5 | 12.5 |
| Example 2 | 90 | 10 | 1040 | 66.7 | 0.8 | 0.32 | 12.5 | 12.5 |
| Example 3 | 25 | 75 | 850 | 44.7 | 1.2 | 0.66 | 12.5 | 10.0 |
| Example 4 | 50 | 50 | 880 | 43.2 | 1.0 | 0.57 | 12.5 | 10.0 |
| Comparative example 1 | 100 | 0 | 1010 | 45.5 | 1.3 | 0.72 | 12.5 | 6.3 |
| Comparative example 2 | 0 | 100 | 820 | 43.9 | 3.0 | 1.54 | 12.5 | 6.3 |
| Comparative example 3 | 75 | 25 | 320 | 5.0 | — | — | 3.2 | 1.6 |

Examples 5 to 8

Figure 5:
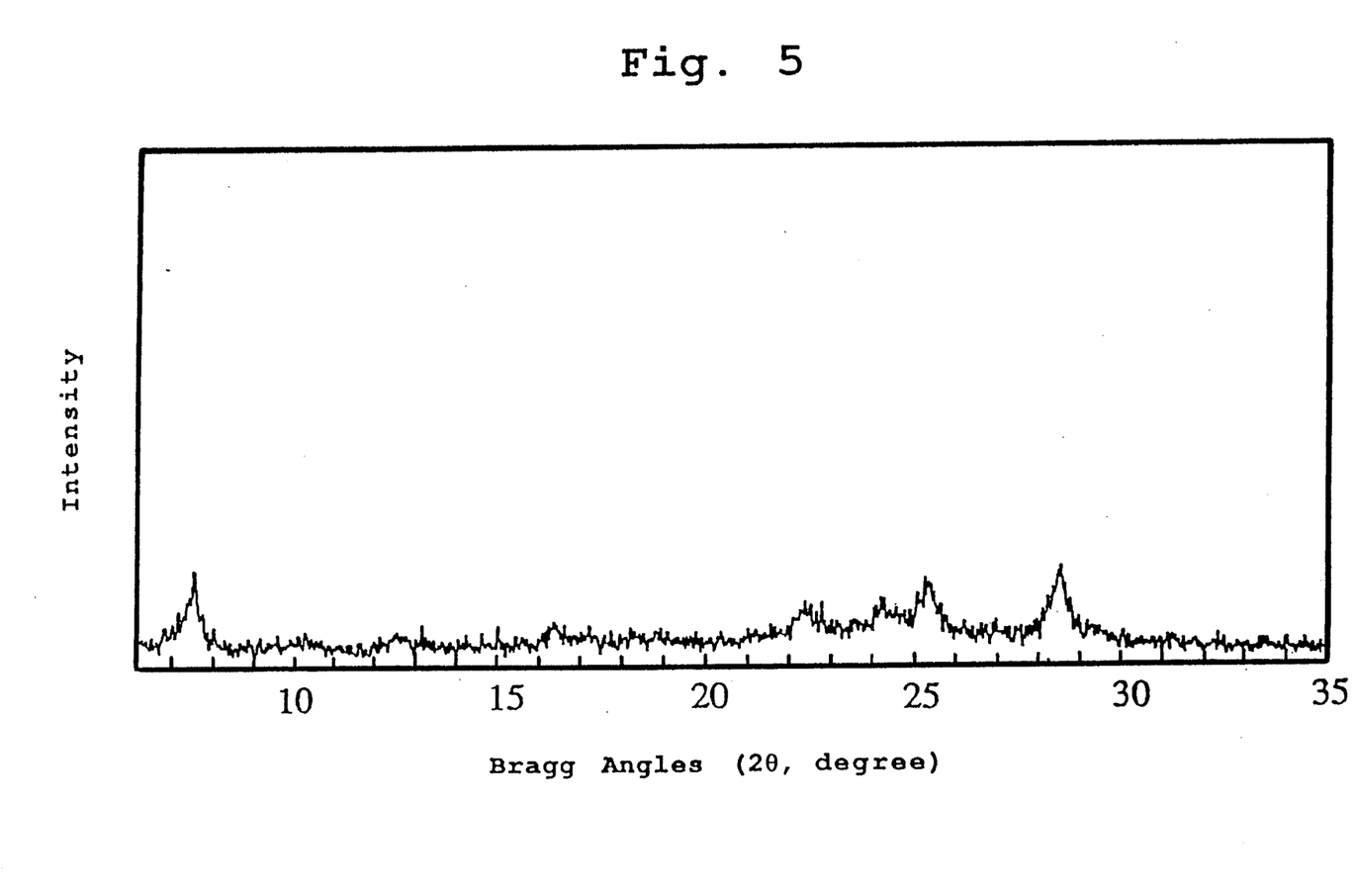
FIG. 5 is an X-ray diffraction spectrum of phthalocyanine compositions treated with methyl ethyl ketone in Examples 5 to 8.

Crystals were prepared according to Examples 1 to 4 except for carrying out treatment with an organic solvent by using methyl ethyl ketone in place of N-methyl-2-pyrrolidone used in Examples 1 to 4. The X-ray diffraction spectrum of these crystals is shown in FIG. 5.

Comparative Examples 4 and 5

Figure 6:
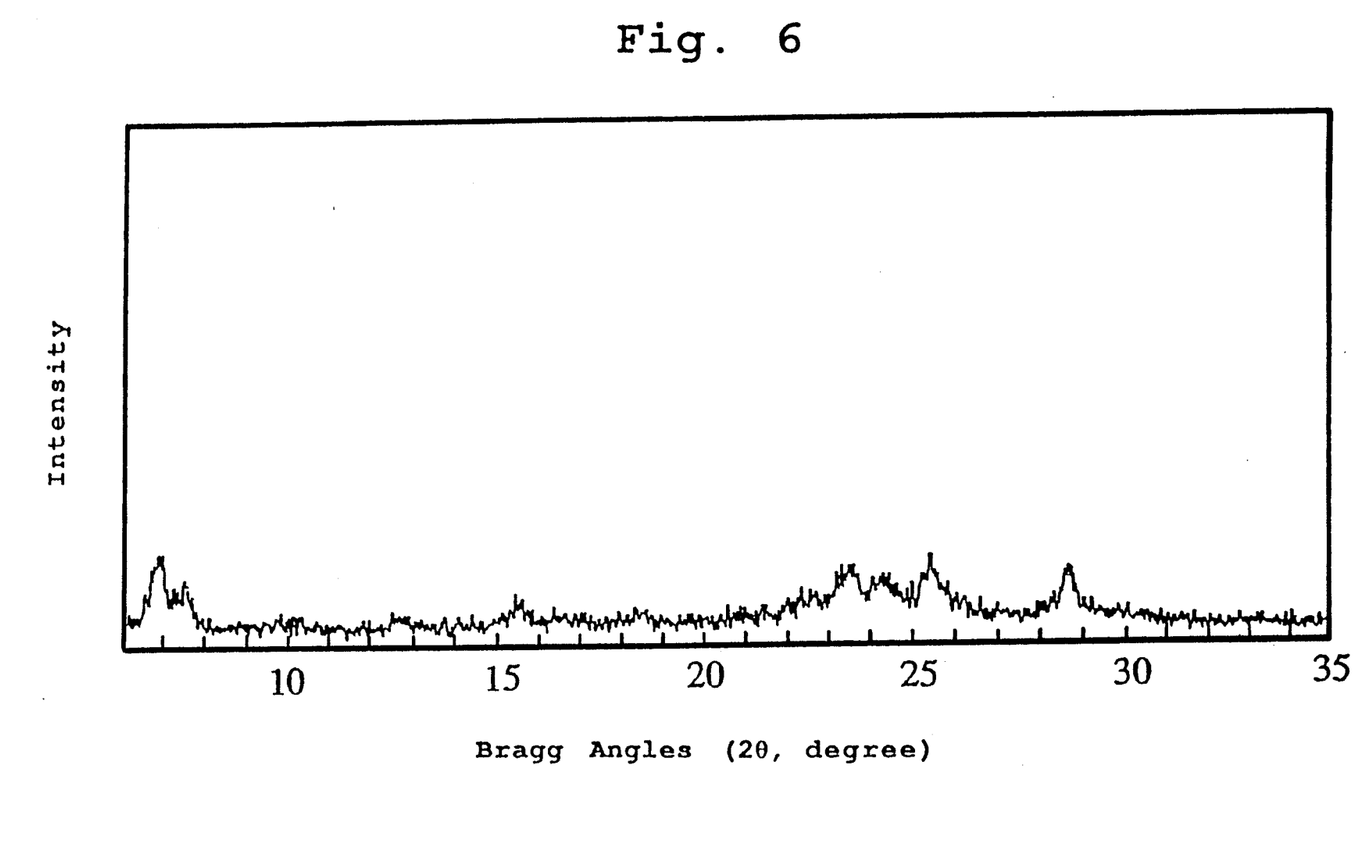
FIG. 6 is an X-ray diffraction spectrum of titanylphthalocyanine treated with methyl ethyl ketone in Comparative example 4.
Figure 7:
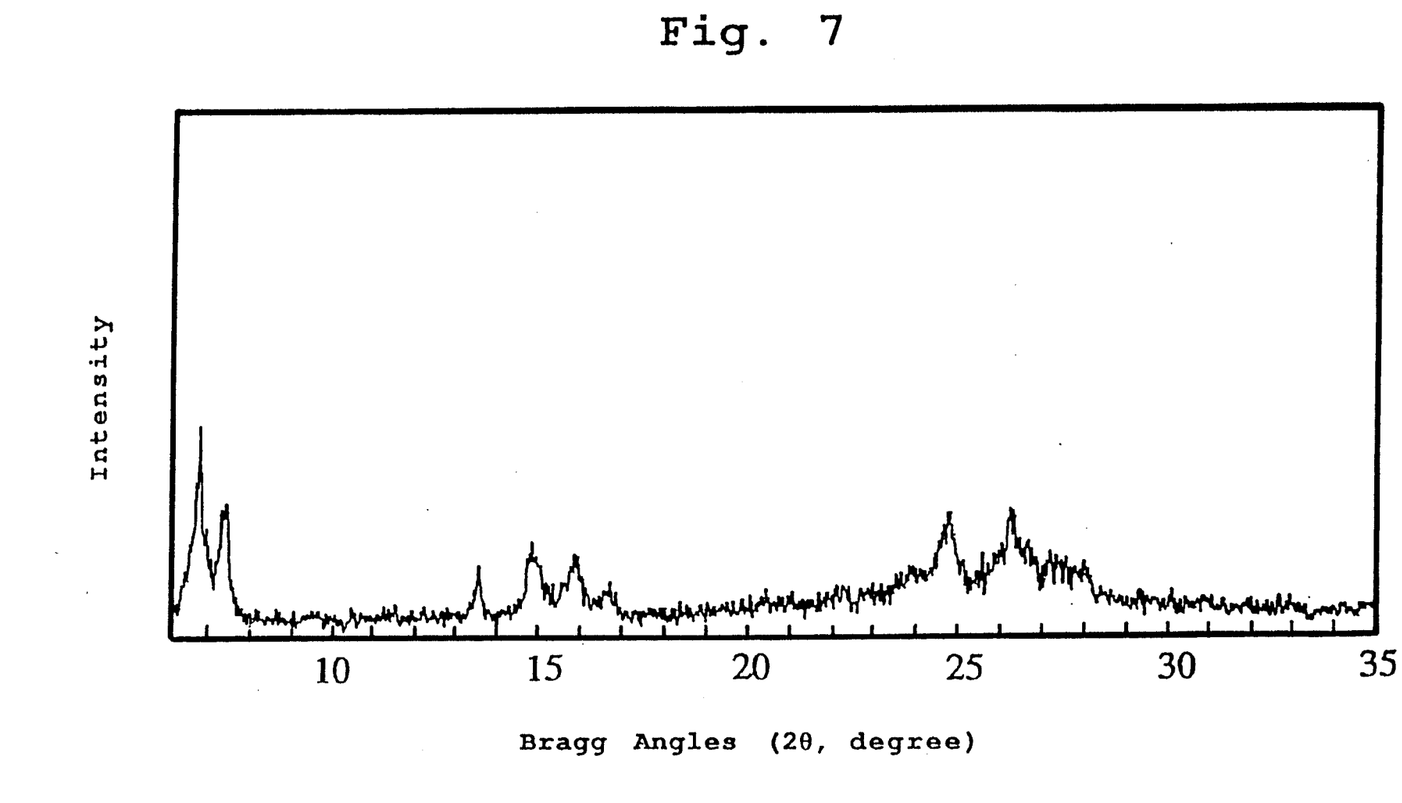
FIG. 7 is an X-ray diffraction spectrum of chloroindium phthalocyanine treated with methyl ethyl ketone in Comparative example 5.

Crystals were prepared according to Comparative examples 1 and 2 except for carrying out treatment with an organic solvent by using methyl ethyl ketone in place of N-methyl-2-pyrrolidone used in Comparative examples 1 and 2. The X-ray diffraction spectra of these crystals are shown in FIGS. 6 and 7, respectively.

nine in place of chloroindium phthalocyanine used in Comparative example 3, and an electrophotographic photoreceptor was prepared by using the powder. The X-ray diffraction spectrum of the powder was the same as that of FIG. 4.

The electrophotographic characteristics of Examples 9 to 12 and Comparative examples 6 to 8 are shown in Table 3.

TABLE 3

|  | TiOPc (wt %) | InPcCl (wt %) | Initial charge $V_0$ (−V) | Dark decay DDR (%) | White light sensitivity $E_{\frac{1}{2}}$ (lux·sec) | Spectral sensitivity $E_{50}$ ($\mu J/cm^2$) | Resolution (line/mm) | |
|---|---|---|---|---|---|---|---|---|
|  |  |  |  |  |  |  | Initial | Charging · discharging after $10^4$ times |
| Example 9 | 75 | 25 | 820 | 69.7 | 0.7 | 0.28 | 12.5 | 12.5 |
| Example 10 | 90 | 10 | 880 | 57.1 | 0.9 | 0.37 | 12.5 | 12.5 |
| Example 11 | 25 | 75 | 770 | 44.2 | 1.4 | 0.77 | 12.5 | 10.0 |
| Example 12 | 50 | 50 | 810 | 45.0 | 1.1 | 0.65 | 12.5 | 10.0 |
| Comparative example 6 | 100 | 0 | 990 | 44.9 | 1.4 | 0.72 | 10.0 | 6.3 |
| Comparative example 7 | 0 | 100 | 750 | 42.1 | 3.2 | 1.71 | 10.0 | 4.0 |
| Comparative example 8 | 75 | 25 | 300 | 5.7 | — | — | 3.2 | 1.6 |

The electrophotographic characteristics of Examples 5 to 8 and Comparative examples 4 and 5 are shown in Table 2.

TABLE 2

|  | TiOPc (wt %) | InPcCl (wt %) | Initial charge $V_0$ (−V) | Dark decay DDR (%) | White light sensitivity $E_{\frac{1}{2}}$ (lux·sec) | Spectral sensitivity $E_{50}$ ($\mu J/cm^2$) | Resolution (line/mm) | |
|---|---|---|---|---|---|---|---|---|
|  |  |  |  |  |  |  | Initial | Charging · discharging after $10^4$ times |
| Example 5 | 75 | 25 | 920 | 64.3 | 0.6 | 0.26 | 12.5 | 12.5 |
| Example 6 | 90 | 10 | 920 | 55.7 | 0.5 | 0.24 | 12.5 | 12.5 |
| Example 7 | 25 | 75 | 670 | 19.4 | 1.0 | 0.60 | 10.0 | 10.0 |
| Example 8 | 50 | 50 | 740 | 21.6 | 0.8 | 0.46 | 10.0 | 10.0 |
| Comparative example 4 | 100 | 0 | 660 | 9.1 | 2.6 | 1.42 | 6.3 | 3.2 |
| Comparative example 5 | 0 | 100 | 600 | 16.7 | 3.2 | 1.73 | 10.0 | 4.0 |

Examples 9 to 12

Crystals and electrophotographic photoreceptors using the crystals were prepared according to Examples 1 to 4 except for using bromoindium phthalocyanine in place of chloroindium phthalocyanine used in Examples 1 to 4, and using the above charge transport substance No. 2 in place of the above charge transport substance No. 1 as a charge transport material.

Comparative Example 6

An electrophotographic photoreceptor was prepared according to Comparative example 1 except for using the above charge transport substance No. 2 in place of the above charge transport substance No. 1 used in Comparative example 1 as a charge transport material

Comparative Example 7

Crystal and an electrophotographic photoreceptor using the crystal were prepared according to Comparative example 2 except for using bromoindium phthalocyanine in place of chloroindium phthalocyanine used in Comparative example 2, and using the above charge transport substance No. 2 in place of the above charge transport substance No. 1 as a charge transport material.

Comparative Example 8

Powder was prepared according to Comparative example 3 except for using bromoindium phthalocya-

Examples 13 to 16

Crystals and electrophotographic photoreceptors using the crystals were prepared according to Examples 1 to 4 except for using chlorogallium phthalocyanine in place of chloroindium phthalocyanine used in Examples 1 to 4, and using the above charge transport substance No. 3 in place of the above charge transport substance No. 1 as a charge transport material.

Comparative Example 9

An electrophotographic photoreceptor was prepared according to Comparative example 1 except for using the above charge transport substance No. 3 in place of the above charge transport substance No. 1 used in Comparative example 1 as a charge transport material

Comparative Example 10

Crystal and an electrophotographic photoreceptor using the crystal were prepared according to Comparative example 2 except for using chlorogallium phthalocyanine in place of chloroindium phthalocyanine used in Comparative example 2, and using the above charge transport substance No. 3 in place of the above charge transport substance No. 1 as a charge transport material.

Comparative Example 11

Powder was prepared according to Comparative example 3 except for using chlorogallium phthalocyanine in place of chloroindium phthalocyanine used in Comparative example 3, and an electrophotographic photoreceptor was prepared by using the powder. The X-ray diffraction spectrum of the powder was the same as that of FIG. 4.

The electrophotographic characteristics of Examples 13 to 16 and Comparative examples 9 to 11 are shown in Table 4.

above charge transport substance No. 1 as a charge transport material.

Comparative Example 14

Powder was prepared according to Comparative example 3 except for using chloroaluminum phthalocy-

TABLE 4

| | TiOPc (wt %) | InPcCl (wt %) | Initial charge $V_0(-V)$ | Dark decay DDR (%) | White light sensitivity $E_{\frac{1}{2}}$ (lux · sec) | Spectral sensitivity $E_{50}$ ($\mu J/cm^2$) | Resolution (line/mm) | |
|---|---|---|---|---|---|---|---|---|
| | | | | | | | Initial | Charging · dis- charging after $10^4$ times |
| Example 13 | 75 | 25 | 820 | 66.9 | 0.7 | 0.31 | 12.5 | 12.5 |
| Example 14 | 90 | 10 | 850 | 56.8 | 1.0 | 0.42 | 12.5 | 12.5 |
| Example 15 | 25 | 75 | 700 | 38.1 | 1.7 | 0.93 | 10.0 | 10.0 |
| Example 16 | 50 | 50 | 700 | 42.3 | 1.2 | 0.67 | 12.5 | 10.0 |
| Comparative example 9 | 100 | 0 | 980 | 44.2 | 1.3 | 0.72 | 10.0 | 6.3 |
| Comparative example 10 | 0 | 100 | 660 | 23.4 | 3.9 | 2.05 | 8.0 | 4.0 |
| Comparative example 11 | 75 | 25 | 290 | 5.2 | — | — | 3.2 | 1.6 |

Examples 17 to 20

Crystals and electrophotographic photoreceptors using the crystals were prepared according to Examples 1 to 4 except for using chloroaluminum phthalocyanine in place of chloroindium phthalocyanine used in Examples 1 to 4, and using 1 g of the above compound No. 4 in place of 1.5 g of the above compound No. 1 as a charge transport material.

Comparative Example 12

An electrophotographic photoreceptor was prepared according to Comparative example 1 except for using 1 g of the above charge transport substance No. 4 in place of 1.5 g of the above charge transport substance No. 1 used in Comparative example 1 as a charge transport material Comparative Example 13

Crystal and an electrophotographic photoreceptor using the crystal were prepared according to Comparative example 2 except for using chloroaluminum phthalocyanine in place of chloroindium phthalocyanine used in Comparative example 2, and using 1 g of the above charge transport substance No. 4 in place of 1.5 g of the anine in place of chloroindium phthalocyanine used in Comparative example 3, and an electrophotographic photoreceptor was prepared by using the powder. The X-ray diffraction spectrum of the powder was the same as that of FIG. 4.

The electrophotographic characteristics of Examples 17 to 20 and Comparative examples 12 to 14 are shown in Table 5.

TABLE 5

| | TiOPc (wt %) | InPcCl (wt %) | Initial charge $V_0(-V)$ | Dark decay DDR (%) | White light sensitivity $E_{\frac{1}{2}}$ (lux · sec) | Spectral sensitivity $E_{50}$ ($\mu J/cm^2$) | Resolution (line/mm) | |
|---|---|---|---|---|---|---|---|---|
| | | | | | | | Initial | Charging · dis- charging after $10^4$ times |
| Example 17 | 75 | 25 | 880 | 57.9 | 1.1 | 0.45 | 12.5 | 12.5 |
| Example 18 | 90 | 10 | 930 | 55.3 | 1.2 | 0.49 | 12.5 | 12.5 |
| Example 19 | 25 | 75 | 480 | 14.9 | 1.5 | 0.83 | 8.0 | 8.0 |
| Example 20 | 50 | 50 | 540 | 29.5 | 1.3 | 0.72 | 10.0 | 10.0 |
| Comparative example 12 | 100 | 0 | 970 | 42.2 | 1.5 | 0.83 | 10.0 | 6.3 |
| Comparative example 13 | 0 | 100 | 420 | 9.7 | 2.6 | 1.38 | 6.3 | 3.2 |
| Comparative example 14 | 75 | 25 | 250 | 4.7 | — | — | 3.2 | 1.6 |

Examples 21 to 24

Crystals and electrophotographic photoreceptors using the crystals were prepared according to Examples 1 to 4 except for using 0.9 g of a polyvinyl butyral resin Ethlec BL-S (trade name, available from Sekisui Kagaku Co.) and 0.1 g of a melamine resin ML351W (trade name, available from Hitachi Chemical Co., Ltd.) in place of 1 g of a silicone resin KR-255 (trade name) used in Example 1, and using 49 g of 2-methoxyethanol and 49 g of tetrahydrofuran in place of 98 g of 1,2-dichloroethane used in Example 1.

Electrophotographic characteristics of Examples 21 to 24 are shown in Table 6.

In addition to the results shown in Table 6, samples of Examples 21 to 24 showed a low water absorbing ratio of the charge transport layer and no lowering in electrophotographic characteristics was observed even under high temperature and high humidity conditions.

TABLE 6

| | TiOPc (wt %) | InPcCl (wt %) | Initial charge $V_0 (-V)$ | Dark decay DDR (%) | White light sensitivity $E_{\frac{1}{2}}$ (lux · sec) | Spectral sensitivity $E_{50}$ ($\mu J/cm^2$) | Resolution (line/mm) Initial | Charging · discharging after $10^4$ times |
|---|---|---|---|---|---|---|---|---|
| Example 21 | 75 | 25 | 980 | 64.2 | 0.7 | 0.30 | 12.5 | 12.5 |
| Example 22 | 90 | 10 | 1010 | 64.3 | 0.7 | 0.31 | 12.5 | 12.5 |
| Example 23 | 25 | 75 | 840 | 42.8 | 1.2 | 0.65 | 12.5 | 10.0 |
| Example 24 | 50 | 50 | 850 | 42.2 | 1.0 | 0.55 | 12.5 | 10.0 |

Example 25

In 50 ml of sulfuric acid was dissolved 1 g of a phthalocyanine mixture comprising 0.75 g of titanylphthalocyanine and 0.25 g of chloroindium phthalocyanine, and the mixture was stirred at room temperature for 30 minutes. Subsequently, the mixture was added dropwise to one liter of a deionized water cooled with ice water over about 40 minutes to be reprecipitated. The mixture was further stirred for 1 hour under cooling, and left to stand overnight. After the supernatant was removed by decantation, the precipitates were separated by centrifugation to obtain 700 mg of the precipitates. In the first washing, to 700 mg of the precipitates was added 120 ml of a deionized water as a washing water, and the mixture was stirred. Then, the precipitates and the washing water were separated and removed by centrifugation. The same washing operation was carried out successively five times. The pH and conductivity of the washing water (namely washing water after washing) separated and removed in the sixth operation were measured (at 23° C). The pH was measured by using Model PH51 (trade name, manufactured by Yokogawa Denki Co.). Further, the conductivity was measured by Model SC-17A (trade name, manufactured by Shibata Kagaku Kikai Kogyo Co.). The pH of the washing water was 3.3, and the conductivity was 65.1 $\mu$S/cm, Subsequently, the precipitates were washed with 60 ml of methanol three times, and then dried under vacuum by heating at 60° C. for 4 hours.

Next, 1 g of this product dried under vacuum was added to 10 ml of N-methyl-2-pyrrolidone, and the mixture was heated and stirred (150° C., 1 hour). After filtration, the residue was washed with methanol and dried under vacuum by heating at 60° C. for 4 hours to obtain crystal of the phthalocyanine composition of the present invention. The X-ray diffraction spectrum of this crystal is substantially the same as that in FIG. 1.

Examples 26 and 27

Phthalocyanine compositions were prepared in the same manner as in Example 25 except for changing washing times after treatment with sulfuric acid. The pH and conductivity of each washing water are shown in Table 7.

Comparative Examples 15 to 17

Phthalocyanine compositions were prepared in the same manner as in Example 25 except for changing washing times after treatment with sulfuric acid. The pH and conductivity of each washing water are shown in Table 7.

TABLE 7

| | Washing times | pH | Conductivity ($\mu$S/cm) |
|---|---|---|---|
| Comparative example 15 | 3 | 0.7 | 15000 |
| Example 25 | 6 | 3.3 | 262 |
| Example 26 | 9 | 3.8 | 36.0 |
| Example 27 | 12 | 4.0 | 17.8 |
| Comparative example 16 | 18 | 4.5 | 5.8 |
| Comparative example 17 | 28 | 7.4 | 3.4 |

Examples 28 to 30

Crystals of phthalocyanine compositions were obtained according to Examples 25 to 27 except for using bromoindium phthalocyanine in place of chloroindium phthalocyanine used in Examples 25 to 27. The pH and conductivity of each washing water are shown in Table 8.

Comparative Examples 18 to 20

Crystals of phthalocyanine compositions were obtained according to Comparative examples 15 to 17 except for using bromoindium phthalocyanine in place of chloroindium phthalocyanine used in Comparative examples 15 to 17. The pH and conductivity of each washing water are shown in Table 8.

TABLE 8

| | Washing times | pH | Conductivity ($\mu$S/cm) |
|---|---|---|---|
| Comparative example 18 | 3 | 0.7 | 4500 |
| Example 28 | 6 | 3.4 | 202 |
| Example 29 | 9 | 3.7 | 35.8 |
| Example 30 | 12 | 4.1 | 10.8 |
| Comparative example 19 | 18 | 4.5 | 5.8 |
| Comparative example 20 | 28 | 7.7 | 3.1 |

Examples 31 to 33

Crystals of phthalocyanine compositions were obtained according to Examples 25 to 27 except for using chlorogallium phthalocyanine in place of chloroindium phthalocyanine used in Examples 25 to 27. The pH and conductivity of each washing water are shown in Table 9.

Comparative Examples 21 to 23

Crystals of phthalocyanine compositions were obtained according to Comparative examples 15 to 17 except for using chlorogallium phthalocyanine in place of chloroindium phthalocyanine used in Comparative examples 15 to 17. The pH and conductivity of each washing water are shown in Table 9.

TABLE 9

| | Washing times | pH | Conductivity ($\mu$S/cm) |
|---|---|---|---|
| Comparative example 21 | 3 | 1.8 | 6800 |

TABLE 9-continued

| | Washing times | pH | Conductivity (μS/cm) |
|---|---|---|---|
| Example 31 | 6 | 3.6 | 211 |
| Example 32 | 9 | 3.8 | 36.0 |
| Example 33 | 12 | 4.0 | 17.8 |
| Comparative example 22 | 18 | 4.8 | 7.3 |
| Comparative example 23 | 28 | 7.1 | 3.4 |

Examples 34 to 36

Crystals of phthalocyanine compositions were obtained according to Examples 25 to 27 except for using chloroaluminum phthalocyanine in place of chloroindium phthalocyanine used in Examples 25 to 27. The pH and conductivity of each washing water are shown in Table 10.

Comparative Examples 24 to 26

Crystals of phthalocyanine compositions were obtained according to Comparative examples 15 to 17 except for using chloroaluminum phthalocyanine in place of chloroindium phthalocyanine used in Comparative examples 15 to 17. The pH and conductivity of each washing water are shown in Table 10.

TABLE 10

| | Washing times | pH | Conductivity (μS/cm) |
|---|---|---|---|
| Comparative example 24 | 3 | 1.1 | 7900 |
| Example 34 | 6 | 3.2 | 234 |
| Example 35 | 9 | 4.0 | 20.3 |
| Example 36 | 12 | 4.4 | 12.8 |
| Comparative example 25 | 18 | 5.3 | 5.5 |
| Comparative example 26 | 28 | 6.8 | 3.4 |

Example 37

1.5 g of the phthalocyanine composition prepared in Example 25, 1 g of a silicone resin KR-255 (trade name, produced by Shinetsu Kagaku Kogyo Co.) and 98 g of 1,2-dichloroethane were mixed, and the mixture was dispersed by a ball mill. The dispersion obtained was coated on an aluminum plate (conductive substrate, 100 mm × 100 mm × 0.1 mm) by the dip coating method, and dried at 140° C. for 1 hour to form a charge generation layer having a thickness of 0.5 μm.

A coating solution obtained by mixing 1.5 g of the above charge transport substance No. 4, 1.5 g of a polycarbonate resin Yupilon S-3000 (trade name, produced by Mitsubishi Gas Kagaku Co.) and 15.5 g of methylene chloride was coated on the above substrate by the dip coating method, and dried at 120° C. for 1 hour to form a charge transport layer having a thickness of 20 μm.

The electrophotographic characteristics of this electrophotographic photoreceptor were measured by an electrostatic copying paper testing device Model SP-428 (trade name, manufactured by Kawaguchi Denki Co.). The photoreceptor was charged by corona charging of −5 kV under dark condition, and initial charge $V_0$ (−V) after 10 seconds, dark decay DDR (%) after 30 seconds and sensitivity $E_{\frac{1}{2}}$ (lux·sec) when exposure was carried out by white light with a luminosity of 2 lux were determined.

As a result, it was found that $V_0$=640 (−V), DDR=68.5 (%) and $E_{178}$ =0.7 (lux·sec).

Electrophotographic photoreceptors were prepared according to Example 37 except for using the titanylphthalocyanine compositions obtained in Examples 26 and 27, and evaluated. The results are shown in Table 11.

Comparative Examples 27 to 29

Electrophotographic photoreceptors were prepared according to Example 37 except for using the titanylphthalocyanine compositions obtained in Comparative examples 15 to 17, and evaluated. The results are shown in Table 11.

TABLE 11

| | Charge-generation material | Charge-transport material | Initial charge $V_0$ (−V) | Dark decay DDR (%) | Sensitivity $E_{\frac{1}{2}}$ (lux · sec) |
|---|---|---|---|---|---|
| Example 37 | Crystal obtained in Example 25 | No. 4 | 640 | 68.5 | 0.7 |
| Example 38 | Crystal obtained in Example 26 | No. 4 | 780 | 51.3 | 0.6 |
| Example 39 | Crystal obtained in Example 27 | No. 4 | 670 | 50.7 | 0.7 |
| Comparative example 27 | Crystal obtained in Comparative example 15 | No. 4 | 400 | 15.0 | 0.9 |
| Comparative example 28 | Crystal obtained in Comparative example 16 | No. 4 | 390 | 19.2 | 0.9 |
| Comparative example 29 | Crystal obtained in Comparative example 17 | No. 4 | 540 | 37.0 | 0.9 |

Examples 40 to 42

Electrophotographic photoreceptors were prepared according to Examples 37 to 39 except for using the titanylphthalocyanine compositions obtained in Examples 28 to 30 in place of that obtained in Example 37 and using Compound No. 2 in place of No. 4 as a charge transport material, and evaluated. The results are shown in Table 12.

Comparative Examples 30 to 32

Electrophotographic photoreceptors were prepared according to Example 37 except for using the titanylphthalocyanine compositions obtained in Comparative examples 18 to 20 and using Compound No. 2 in place of No. 4 as a charge transport material, and evaluated. The results are shown in Table 12.

TABLE 12

|  | Charge-generation material | Charge-transport material | Initial charge $V_0(-V)$ | Dark decay DDR (%) | Sensitivity $E_{\frac{1}{2}}$ (lux·sec) |
| --- | --- | --- | --- | --- | --- |
| Example 40 | Crystal obtained in Example 28 | No. 2 | 820 | 69.7 | 0.7 |
| Example 41 | Crystal obtained in Example 29 | No. 2 | 880 | 57.1 | 0.7 |
| Example 42 | Crystal obtained in Example 30 | No. 2 | 990 | 51.7 | 0.7 |
| Comparative example 30 | Crystal obtained in Comparative example 18 | No. 2 | 410 | 25.9 | 1.1 |
| Comparative example 31 | Crystal obtained in Comparative example 19 | No. 2 | 460 | 26.5 | 2.6 |
| Comparative example 32 | Crystal obtained in Comparative example 20 | No. 2 | 500 | 30.1 | 2.0 |

Examples 43 to 45

Electrophotographic photoreceptors were prepared according to Examples 37 to 39 except for using the titanylphthalocyanine compositions obtained in Examples 31 to 33 in place of that obtained in Example 37 and using Compound No. 5 in place of No. 4 as a charge transport material, and evaluated. The results are shown in Table 13.

Comparative Examples 33 to 35

Electrophotographic photoreceptors were prepared according to Example 37 except for using the titanylphthalocyanine compositions obtained in Comparative examples 21 to 23 and using Compound No. 5 in place of No. 4 as a charge transport material, and evaluated. The results are shown in Table 13.

Examples 46 to 48

Electrophotographic photoreceptors were prepared according to Examples 37 to 39 except for using the titanylphthalocyanine compositions obtained in Examples 34 to 36 in place of that obtained in Example 37 and using Compound No. 1 in place of No. 4 as a charge transport material, and evaluated. The results are shown in Table 14.

Comparative Examples 36 to 38

Electrophotographic photoreceptors were prepared according to Example 37 except for using the titanylphthalocyanine compositions obtained in Comparative examples 24 to 26 and using Compound No. 1 in place of No. 4 as a charge transport material, and evaluated. The results are shown in Table 14.

TABLE 13

|  | Charge-generation material | Charge-transport material | Initial charge $V_0(-V)$ | Dark decay DDR (%) | Sensitivity $E_{\frac{1}{2}}$ (lux·sec) |
| --- | --- | --- | --- | --- | --- |
| Example 43 | Crystal obtained in Example 31 | No. 5 | 700 | 58.6 | 0.7 |
| Example 44 | Crystal obtained in Example 32 | No. 5 | 820 | 66.9 | 0.8 |
| Example 45 | Crystal obtained in Example 33 | No. 5 | 800 | 56.8 | 0.7 |
| Comparative example 33 | Crystal obtained in Comparative example 21 | No. 5 | 520 | 24.2 | 1.3 |
| Comparative example 34 | Crystal obtained in Comparative example 22 | No. 5 | 560 | 25.3 | 1.2 |
| Comparative example 35 | Crystal obtained in Comparative example 23 | No. 5 | 600 | 36.3 | 1.5 |

TABLE 14

|  | Charge-generation material | Charge-transport material | Initial charge $V_0(-V)$ | Dark decay DDR (%) | Sensitivity $E_{\frac{1}{2}}$ (lux·sec) |
| --- | --- | --- | --- | --- | --- |
| Example 46 | Crystal obtained in Example 34 | No. 1 | 880 | 57.9 | 1.1 |
| Example 47 | Crystal obtained in Example 35 | No. 1 | 930 | 55.3 | 1.2 |
| Example 48 | Crystal obtained in Example 36 | No. 1 | 870 | 52.7 | 1.2 |
| Comparative example 36 | Crystal obtained in Comparative example 24 | No. 1 | 420 | 23.7 | 2.6 |
| Comparative example 37 | Crystal obtained in Comparative example 25 | No. 1 | 540 | 29.5 | 1.9 |
| Comparative example 38 | Crystal obtained in Comparative example 26 | No. 1 | 480 | 30.7 | 2.0 |

An electrophotographic photoreceptor using a coating solution for a charge generation layer containing a novel phthalocyanine composition obtained by the preparation process of the present invention has excellent electrophotographic characteristics such as charging characteristics, dark decay, sensitivity and resolution power, and can be applied suitably to an electrophotographic process to which higher density and higher image quality than those of the prior art are required.

What is claimed is:

1. An elecrophotographic photoreceptor having a photoconductive layer containing an organic photoconductive substance on a conductive substrate, charaterized in that said organic photoconductive substance is a phthalocyanine composition having main diffraction peaks at 7.5°, 22.5°, 24.3°, 25.3° and 28.6° of Bragg angles ($2\theta \pm 0.2°$) in an X-ray diffraction spectrum with Cu K$\alpha$, prepared by mixing a titanylphthalocyanine and a halogenated metal phthalocyanine in which a central metal is trivalent to prepare a phthalocyanine mixture, making the mixture amorphous by an acid pasting method, washing the amorphous mixture with water until a washing water after washing has a pH of 3 to 6 and a conductivity of 10 to 300 µS/cm, and then treating the mixture with an organic solvent to convert a crystal form of the composition.

2. The electrophotographic photoreceptor according to claim 1 wherein the washing water after washing has a pH of 3 to 6 and a conductivity of 10 to 100 µS/cm.

3. A double-layered type electrophotographic photoreceptor which comprises a charge generation layer containing the phthalocyanine composition according to claim 1 as a charge generating material, and a charge transport layer containing a benzidine derivative represented by the following formula (I):

wherein $R_1$ and $R_2$ each independently represents a hydrogen atom, a halogen atom, an alkyl group, an alkoxy group, an aryl group, a fluoroalkyl group or a fluoroalkoxy group, two $R_3$s each independently represents a hydrogen atom or an alkyl group, $Ar_1$ and $Ar_2$ each independently represents an aryl group, and k, l, m, and n each independently represents an integer of 0 to 5.

4. The electrophotographic photoreceptor according to claim 3 wherein said charge generation layer and the charge transport layer are formed on a conductive support successively in this order.

* * * * *